Dec. 21, 1937.  A. J. AMSLER  2,102,872
MEASURING DEVICE PARTICULARLY FOR MACHINES FOR TESTING MATERIALS
Filed Sept. 5, 1936  2 Sheets-Sheet 1
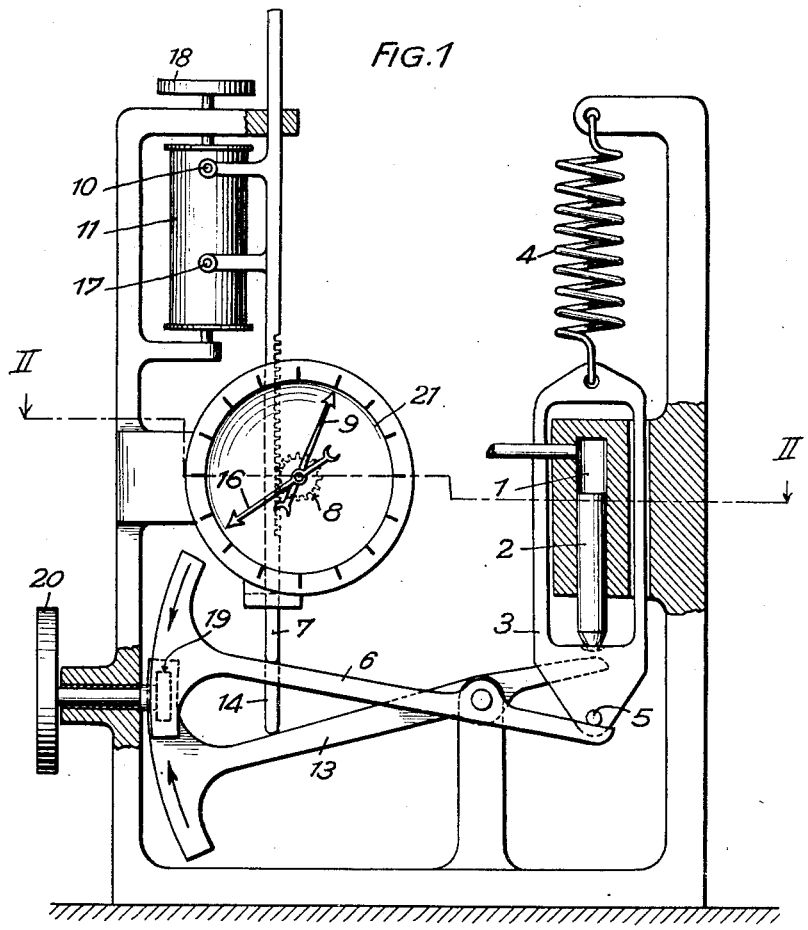
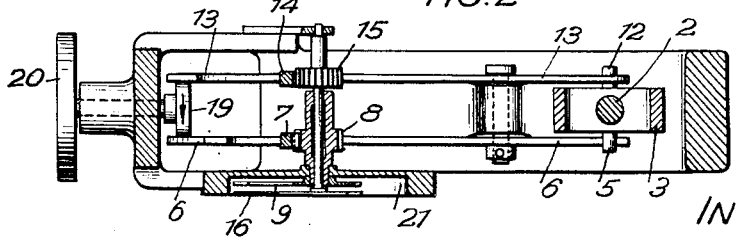
INVENTOR:
Alfred J. Amsler,
By Sommers - Young
Attys Dec. 21, 1937.  A. J. AMSLER  2,102,872
MEASURING DEVICE PARTICULARLY FOR MACHINES FOR TESTING MATERIALS
Filed Sept. 5, 1936    2 Sheets-Sheet 2
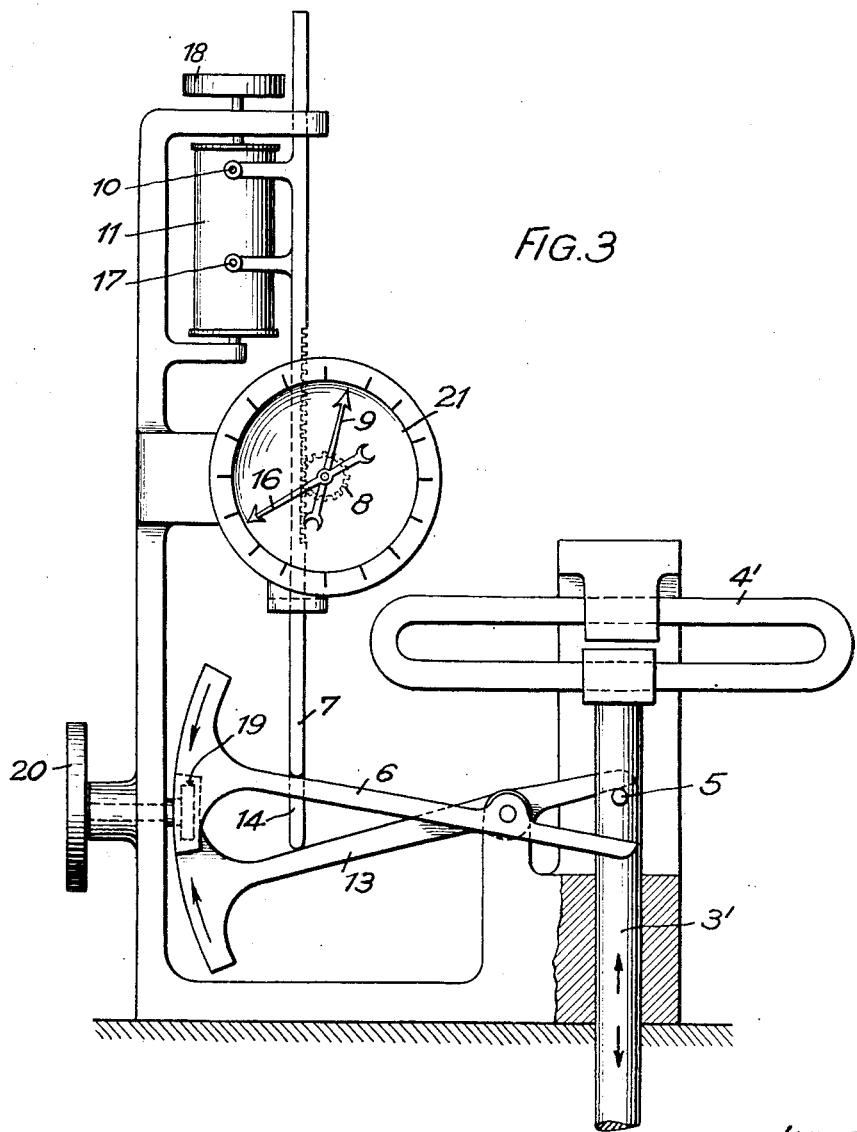
INVENTOR:
Alfred J. Amsler
By Sommers + Young
Attys Patented Dec. 21, 1937

2,102,872

UNITED STATES PATENT OFFICE 2,102,872

MEASURING DEVICE, PARTICULARLY FOR MACHINES FOR TESTING MATERIALS

Alfred J. Amsler, Schaffhouse, Switzerland

Application September 5, 1936, Serial No. 99,646
In Switzerland March 26, 1936

7 Claims. (Cl. 265—2)

This invention relates to devices for measuring the extreme values of periodically repeated loadings, particularly for machines for testing materials.

In machines for testing materials which are adapted for periodically repeated loading of test pieces between two prescribed limits, the provision of a measuring device is required which permits the reading off at any moment during the test the limits of loading and to record the same on a chart in which also subsequent unforeseen deviations from the limits that had actually been reached are perceptible up to destruction of the test pieces, as the case may be. This is true, for example, for hydraulically operated testing machines in the working cylinder of which changes of fluid pressure are to be produced and are to be measured therein or for testing machines in which changes of loading effected in the test piece in mechanical manner are to be transmitted to a plunger, a measuring instrument or the like, for being measured by means of the same, or else for testing machines in which changes of loading mechanically effected in the test piece are to be transmitted to a spring for being measured by means of the latter.

For all these and similar purposes the device according to the present invention qualifies and, in particular, represents an improvement on the conventional manometers, particularly recording manometers, wherein the indicating and recording means influence the manometer spring in which way inaccuracies of measuring are apt to arise.

The device for indicating and continuously recording the extreme values of periodically repeated loadings, particularly for machines for testing materials, according to the present invention, is provided with a measuring spring, one end of which is fixed and the other end, which is acted upon by the loadings, being provided with stop means which so co-act with two feeler levers that the latter are rocked by said stop means in opposite directions of rotation into two end positions that correspond to the two limits of loading, a drive cooperating with the feeler levers by friction action having the tendency to rock the feeler levers in the direction of rotation opposite to that produced by the respective stop means, and transmission elements being provided for transmitting the motions of the feeler levers to indicating and recording means.

In this arrangement, the measuring spring can be of a relatively very heavy construction, for example, for developing a tension of 400 kilograms, which permits to so construct the motion transmission means that practically no influence on the fluctuations of loading is exerted by the same. This device, is, therefore, capable of indicating and recording extreme values accurately.

In the accompanying drawings two constructional forms of the invention are illustrated by way of example only, in which Fig. 1 shows an elevation of a first constructional form of the device;

Fig. 2 shows a horizontal section on the line II—II of Fig. 1, and

Fig. 3 shows an elevation of a second constructional form of the device.

In the device for determining the limits of loading in the interior of a fluid chamber 1, as shown in Figs. 1 and 2, the chamber is connected with the working cylinder of a machine for testing materials to which periodically repeated loadings are applied, a measuring spring 4 being provided for this case which can be subjected to loading in one direction only. The fluid pressure reigning in the chamber 1 forces a plunger 2 against a guide member 3 which hangs on the measuring spring 4 and thus moves downwardly the same amount as the measuring spring expands.

The guide member 3 is provided at one side with a stop pin 5 which cooperates with a feeler lever 6. On this feeler lever 6 a rack 7 abuts which meshes with a pinion 8 which cooperates by means of a hollow pivot with a hand 9. To the rack 7 a stylus 10 is secured which graphically records the longitudinal motions of the rack on a recording drum 11. On the side of the guide member 3 remote from the stop pin 5 a second stop pin 12 is arranged which cooperates from below with a second feeler lever 13 which is mounted on the same pivot as the feeler lever 6 and against which a rack 14 abuts which is in mesh with a pinion 15 which cooperates with a hand 16. The pivot on which the pinion 15 and the hand 16 are carried is coaxial with the hollow pivot of the hand 9. The rack 14 is provided with a stylus 17 which records the longitudinal motions of this rack on the recording drum 11 at the side of the records made by the stylus 10. The recording drum is imparted a uniform rotation, at 18, by suitable means such as a clockwork, transmission means or the like.

For automatically resetting the two feeler levers 6 and 13 a friction disc 19 is provided on the smooth edge of which resiliently bear the inner sides of the ends of the feeler levers, said edge thus moving along with it these ends by frictional engagement, when the disc rotates. If the disc rotates in the direction indicated by the arrow in Fig. 2, the feeler levers 6 and 13 are moved in the direction as indicated by the arrows in Fig. 1 which are opposed to the directions in which the stop pins 5 and 12 act on the feeler levers 6 and 13 respectively. The disc 19 is imparted a uniform rotation, at 20, by any suitable means such as a clockwork motion transmission means or the like.

The device described operates as follows:

The loadings resulting from the fluid chamber 1 act on the guide member 3 in the direction of movement of the latter, thereby changing the length of the measuring spring 4 correspondingly to the magnitude of the change of loading. Since the travel of the spring 4 is not limited in the direction of movement, the spring changes its length in accordance with the variations of loading, so that the end positions of the guide member correspond to the extreme loadings applied thereto. In order to permit reading off and recording the extreme loadings, it is necessary to feel the end positions of the guide member, which during the variations of loading continually oscillates back and forth, by appropriate means and to retain the latter in their positions until a change of their extreme positions takes place. As feeler means, in this case, the two collateral feeler levers 6 and 13 commonly mounted on a pivot are provided which contact on opposite sides with the two stop pins 5 and 12 arranged on the guide member 3 of the spring 4, so as to be forced outwardly by these pins, while the feeler levers slide across the latter, thereby rocking about their pivot until they arrive at their end positions which correspond to the end points of the travel of the spring. The friction disc 19, which acts on the two feeler levers by frictional engagement therewith, in such manner, that the latter have the tendency inherent thereto to reset, thus has the effect that the feeler levers 6 and 13 are continually maintained in contact with the two stop pins 5 and 12 when the travel of the spring and thus also that of the pins 5 and 12 is diminished and, on the other hand, that the feeler levers 6 and 13 are prevented from being abruptly moved outwardly by the stop pins 5 and 12 in the event that the travel of these pins is increased. The effort by means of which the disc 19 rocks the feeler levers 6 and 13 inwardly is chosen to be so small that it is unable to overwhelm the force exerted by the spring 4 for rocking the feeler levers 6 and 13 outwardly and to affect the play of this spring materially.

If it should be otherwise the travel of the spring would be no true equivalent for the variation of loading acting on the spring, and the extreme positions of the two feeler levers 6 and 13 would not correspond to the limits of loading exactly. The friction disc 19 satisfies this requirement as it is provided with a smooth edge and is disposed between the two feeler levers having a lateral spring action inherent thereto and contacts with its smooth edge with the opposed sides of the feeler levers 6 and 13, thereby moving these levers along with it by friction and rocking the same inwardly, in opposite directions, until the feeler levers bear on the stop pins 5 and 12 of the guide member of the spring and are thus arrested so that the edge of the disc is caused to slide on the side surfaces of the feeler levers.

During each complete travel of the spring 4 back and forth each of the stop pins 5 and 12 contacts with the corresponding feeler lever 6 or 13 up to the end of its own travel, thus rocking said lever outwardly, and at the next moment the pin releases the lever again, so that the friction disc can drive it in the opposite direction for the same stop pin to urge it outwardly anew during the next travel of the spring 4. In the meantime the second stop pin hits the second feeler lever to urge it into an extreme position which corresponds to the opposite limit of loading of the spring 4 whereupon the operations are repeated in a similar manner as described in connection with the first feeler lever.

The slower the drive of the friction disc 19 rotates in comparison to the frequency of the fluctuations of loading the less the extreme positions of the feeler levers as recorded deviate from the extreme positions which these levers should actually attain. If the drive is driven in synchronism with the fluctuations of loading the resetting movements of the feeler levers are of equal magnitude during each complete travel of the spring irrespective of the frequency of the fluctuations of loading.

Indicating the extreme positions of the two feeler levers 6 and 13 takes place on the dial 21 by means of the two hands 9 and 16, one of which (9) indicating the lower limit of loading and the other (16) the upper limit of loading of the spring 4. Furthermore, the operation of recording the extreme positions is effected by the two stylus 10 and 17 which draw in the limits of loading on the recording drum. The recording drum 11 is, for example, driven at uniform speed by the machine which effects the changes of loading, while the two stylus 10 and 17 are adjusted on a line parallel with the axis of the drum in accordance with the limits of loading, thereby effecting two graphical records the corresponding magnitudes of which are disposed side by side.

Each of the rod-shaped ends of the two racks 7 and 14 serving for transmitting the rocking motions of the feeler levers to the corresponding hands 9 and 16 respectively forms together with the surface of the adjacent feeler lever 6 or 13 on which it slides the same angle as its correlated guide face on the respective stop pin 5 or 12 forms with the direction of movement of said pin. Thus, if either of the two feeler levers 6 or 13 rocks through a certain angle the corresponding hand 9 or 16 moves over the dial 21 through an angle the relation of which to the angular movement of the respective feeler lever is constant. Moreover, the stretch of travel of each stylus 10 and 17 arranged at the free ends of the racks 7 and 14 respectively is proportional to the angular range passed through by the corresponding hand 9 or 16.

For measuring the limits of variable loadings which are effected in mechanical manner and in only one direction, a device similar to that shown in the Figs. 1 and 2 can be used if the plunger 2 is omitted and the guide member 3 is so constructed that the loading acts on the same directly in the direction opposite to that of the measuring spring 4.

In the device as shown in Fig. 3, a measuring spring 4' is shown which can be subjected to tension as well as compression and is provided with a guide member 3' for taking the tensile and compressive strains. This device is thus adapted for measuring mechanically effected loadings which fluctuate between a positive and a negative limit.

Alternatively, the racks may be horizontally disposed instead of vertically provided that the feeler levers are correspondingly arranged and constructed, for the purpose of eliminating the gravitation action thereof.

I do not limit myself to the particular size, shape, number or arrangement of parts as shown and described, all of which may be varied without going beyond the scope of my invention as shown, described and claimed.

What I claim is:—

1. In a device for measuring the extreme values of periodically repeated loadings, particularly for machines for testing materials, a measuring spring having one end fixed and being subjected at its other end to the fluctuating loadings, stops connected with said other end, two pivotal feeler levers cooperating with said stops to be rocked thereby in opposite directions of rotation into end positions corresponding to two limits of loading of the extreme values to be measured, a drive cooperating with said feeler levers by frictional engagement therewith for rocking each lever in the direction opposite to the rocking movement imparted thereto by its correlated stop, measuring means associated with said feeler levers, and means for transmitting all said rocking movements of said levers to said measuring means.

2. In a device for measuring the extreme values of periodically repeated loadings particularly for machines for testing materials, a measuring spring having one end fixed, a guide member connected to the other end of said spring and being subjected to the fluctuating loadings, stops arranged on said guide member, two pivotal feeler levers cooperating with said stops to be rocked thereby in opposite directions of rotation into end positions corresponding to two limits of loading of the extreme values to be measured, a drive cooperating with said feeler levers by frictional engagement therewith for rocking each lever in the direction opposite to the rocking movement imparted thereto by its correlated stop, measuring means associated with said feeler levers, and means for transmitting all said rocking movements of said levers to said measuring means.

3. In a device for measuring the extreme values of periodically repeated loadings particularly for machines for testing materials, a measuring spring having one end fixed and being subjected at its other end to the fluctuating loadings, stops connected with said other end, two pivotal feeler levers, a pivot commonly carrying said levers for cooperation thereof with said stops to be rocked by the latter in opposite directions of rotation into end positions corresponding to two limits of loading of the extreme values to be measured, a drive cooperating with said feeler levers by frictional engagement therewith for rocking each lever in the direction opposite to the rocking movement imparted thereto by its correlated stop, measuring means associated with said feeler levers, and means for transmitting all said rocking movements of said levers to said measuring means.

4. In a device for measuring the extreme values of periodically repeated loadings particularly for machines for testing materials, a measuring spring having one end fixed and being subjected at its other end to the fluctuating loadings, stops connected with said other end, two springy pivotal feeler levers cooperating with said stops to be rocked thereby in opposite directions of rotation into end positions corresponding to two limits of loading of the extreme values to be measured, a uniformly rotating drive disc arranged between said feeler levers to be straddled thereby circumferentially against lateral inherent spring action of said levers for frictionally rocking each lever in the direction opposite to the rocking movement imparted thereto by its correlated stop, and for sliding past said levers when these are rocked by said stops, measuring means associated with said feeler levers, and means for transmitting all said rocking movements of said levers to said measuring means.

5. In a device for measuring the extreme values of periodically repeated loadings particularly for machines for testing materials, a measuring spring having one end fixed and being subjected at its other end to the fluctuating loadings, stop pins connected with said other end, two pivotal feeler levers slidingly cooperating with said stop pins to be rocked thereby in opposite directions of rotation into end positions corresponding to two limits of loading of the extreme values to be measured, a drive cooperating with said feeler levers by frictional engagement therewith for rocking each lever in the direction opposite to the rocking movement imparted thereto by its correlated stop pin, measuring means associated with said feeler levers, means for transmitting all said rocking movements of said levers to said measuring means, and two parallel rods comprised by said transmission means and slidingly abutting against said feeler levers so that each rod forms together with the adjacent lever the same angle as its correlated guide face on the respective stop pin forms with the direction of movement of said pin.

6. In a device for indicating and continuously recording the extreme values of periodically repeated loadings, particularly for machines for testing materials, a measuring spring having one end fixed and being subjected at its other end to the fluctuating loadings, stop pins connected with said other end, two pivotal feeler levers cooperating with said stop pins to be rocked thereby in opposite directions of rotation into end positions corresponding to two limits of loading of the extreme values to be indicated and continuously recorded, a drive cooperating with said feeler levers by frictional engagement therewith for rocking each lever in the direction opposite to the rocking movement imparted thereto by its correlated stop pin, two recording styluses, a uniformly rotating recording drum cooperating with said styluses for receiving the graphical records of said extreme values of loading side by side, two parallel rods each correlated to one of said styluses for transmitting all said rocking movements of said levers to the respective stylus and butt ends on said rods slidingly engaging with said feeler levers so that each rod forms together with the adjacent lever the same angle as its correlated guide face on the respective stop pin forms with the direction of movement of said pin.

7. In a device for indicating and continuously recording the extreme values of periodically repeated loadings, particularly for machines for testing materials, a measuring spring having one end fixed and being subjected at its other end to the fluctuating loadings, stop pins connected with said other end, two pivotal feeler levers cooperating with said stop pins to be rocked thereby in opposite directions of rotation into end positions corresponding to two limits of loading of the extreme values to be indicated and continuously recorded, a drive cooperating with said feeler levers by frictional engagement therewith for rocking each lever in the direction opposite to the rocking movement imparted thereto by its correlated stop pin, two recording styluses, a uniformly rotating recording drum cooperating with said styluses for receiving the graphical records of said extreme values of loading side by side, two parallel rods each rigidly connected to one of said styluses, butt ends on said rods permanently maintained in sliding surface contact with said feeler levers at an angle between the correlated rods and levers equal to the angle formed by the lever guide face on the respective stop pin and the direction of movement of said pin, and an indicating means positively mechanically operatively connected with each of said rods for indicating in alternate succession all said extreme values recorded in exact time coincidence as they actually set up in said measuring spring.

ALFRED J. AMSLER.